United States Patent [19]

Donguy

[11] 4,227,858
[45] Oct. 14, 1980

[54] FLEXIBLE SPHERICAL JOINT
[75] Inventor: Paul J. Donguy, Bruges, France
[73] Assignee: Societe Europeenne de Propulsion, Puteaux, France
[21] Appl. No.: 850,301
[22] Filed: Nov. 10, 1977
[30] Foreign Application Priority Data Nov. 10, 1976 [FR] France ................. 76 34009

[51] Int. Cl.³ .......................................... B64C 27/38
[52] U.S. Cl. ................. 416/134 A; 416/141; 308/238; 267/152
[58] Field of Search ................. 416/134 A, 141; 308/237 R, 238, 2 R, 2 A, 26; 267/57.1 A, 63 A, 152; 64/27 NM

[56] References Cited
U.S. PATENT DOCUMENTS

| 3,012,767 | 12/1961 | Jones | 416/134 R X |
|---|---|---|---|
| 3,083,065 | 3/1963 | Hinks et al. | 308/237 |
| 3,228,673 | 1/1966 | Hinks | 267/57.1 A |
| 3,390,899 | 7/1968 | Herbert et al. | 403/203 |
| 3,504,902 | 4/1970 | Irwin | 267/1 |
| 3,680,895 | 8/1972 | Herbert | 285/167 |
| 3,761,199 | 9/1973 | Ferris et al. | 416/134 A |
| 3,853,426 | 12/1974 | Rybicki | 416/140 |
| 4,105,266 | 8/1978 | Finney | 416/134 A |

FOREIGN PATENT DOCUMENTS

| 2319425 | 10/1973 | Fed. Rep. of Germany . | |
| 108755 | 10/1943 | Sweden | 416/134 R |
| 661660 | 11/1951 | United Kingdom | 416/134 R |
| 1040777 | 9/1966 | United Kingdom . | |

Primary Examiner—Everette A. Powell, Jr.
Attorney, Agent, or Firm—Lerner, David, Littenberg & Samuel

[57] ABSTRACT

A flexible spherical bearing, comprising two end pieces connected by a stack of interconnected alternate layers of a flexible material, such as elastomer, and of a strong material, such as metallic material and at least one cavity filled with an incompressible fluid and extending between the two end pieces without the interposition of elastomer. Such a bearing is used for connecting a helicopter rotor blade to the rotor hub of this helicopter.

7 Claims, 5 Drawing Figures

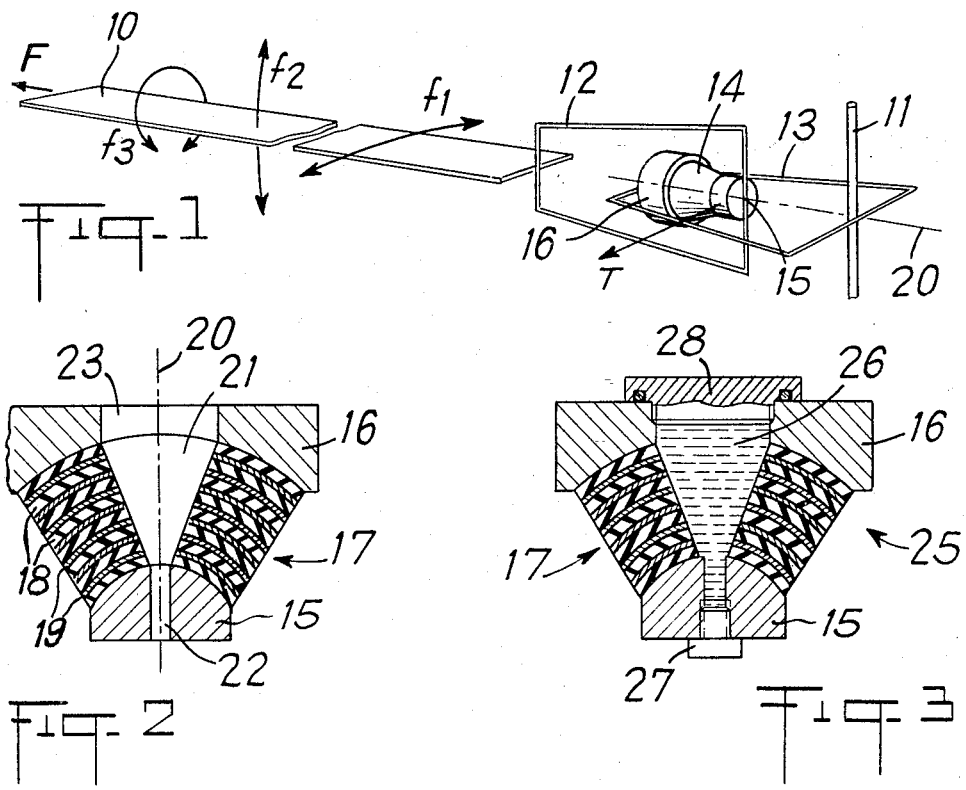
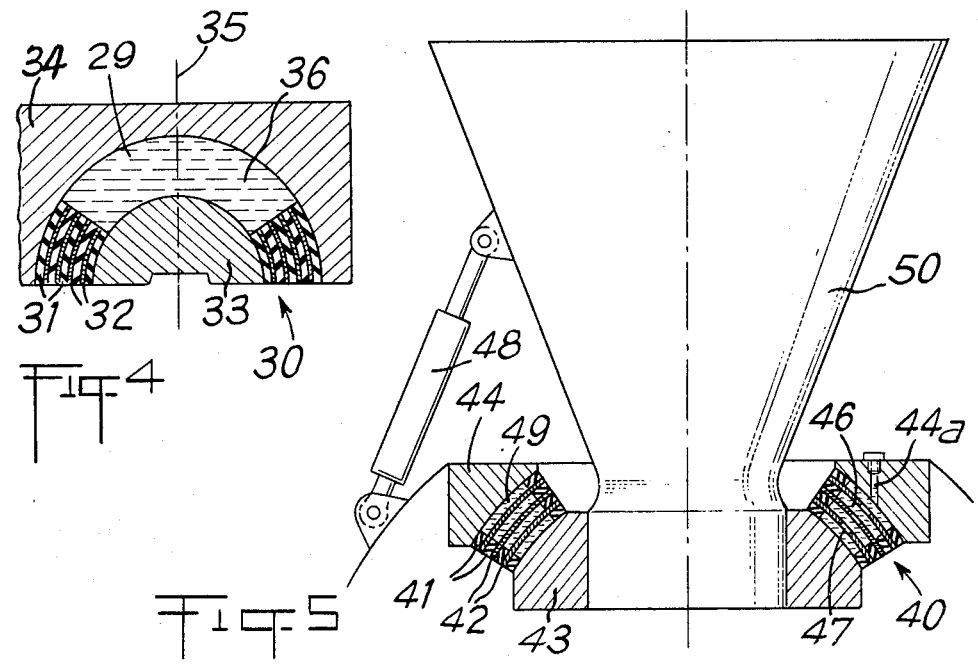

FLEXIBLE SPHERICAL JOINT

The present invention relates to a flexible spherical bearing, of the type comprising two end pieces connected by a stack of interconnected alternate layers of a flexible material, such as elastomer, and of a strong material, such as a metallic material.

The present invention can be applied in particular to bearings connecting a helicopter rotor blade to the rotor hub.

The main problem arising with such bearings is relative to their endurance. Their purpose is indeed to allow the blades to have a flapping, lead-lag and pitching movement, and they have to support the compressive stresses due to the centrifugal forces on the blade and the lateral stresses induced by the aerodynamical drag of the blade.

Elastomer, unfortunately, is destroyed under the effects of the alternate movements of the rotor blades.

Attempts have been made to increase the life of the bearings by giving them a shape and dimensions such that the stresses which they are subjected to are distributed in optimal manner. This solution, however, has a limited effect, on account of the requirements relative to the axial, radial and torsional stiffnesses of the bearings. In particular, it is necessary to retain a limited torsional stiffness since this has a substantial influence on the efforts which the piloting system has to make (orientation of the blade).

It is therefore the aim of the present invention to propose a spherical bearing, in particular for connecting a helicopter blade to the rotor hub, having a clearly longer life compared with that of already existing bearings, without for all that necessating more space or altering the torsional stiffness.

This aim is reached with a bearing of the type indicated at the beginning of the present specification, and comprising, according to the invention, at least one cavity filled with an incompressible fluid and extending between the two end pieces without the interposition of elastomer. This way, the compressional stiffness is increased, but not the torsional stiffness. In the case of the application of said bearing to a helicopter blade, the life of the bearing is increased because it is capable of sustaining the compressive stresses due to the centrifugal force.

In one particular embodiment of the bearing according to the invention, the incompressible fluid is contained in a central cavity of the bearing which cavity is defined at its ends by the end pieces and laterally by the stack.

In another embodiment of a spherical bearing according to the invention, the cavity is formed by openings made in the layers of elastomer and communicating with one another by means of passages formed in the strong material layers.

Other features and advantages of the spherical bearing according to the invention, will be better understood on reading the following description given by way of indication and non-restrictively, and referring to the attached drawings in which:

FIG. 1 is a very schematized view showing the connection between a helicopter rotor blade and the rotor hub;

FIG. 2 is a cross-sectional view of a known spherical bearing;

FIG. 3 is a cross-sectional view of a spherical bearing according to the invention;

FIGS. 4 and 5 are both cross-sectional views of other embodiments of a bearing according to the invention.

FIG. 1 illustrates a helicopter blade 10 connected to a rotor, schematized by its axis 11, by means of a connection comprising two stirrup members 12 and 13 situated in two perpendicular planes and interconnected by a spherical bearing 14. The stirrup member 12 is mounted at the rear end of the blade 10 whilst the stirrup member 13 is mounted on the rotor hub.

The spherical bearing 14 comprises, in known manner, two end pieces 15 and 16 interconnected by a stack 17 of alternate layers of elastomer 18 and of metal 19, for example natural rubber and stainless steel (FIGS. 1 and 2). The layers 18 and 19 are spherical cap-shaped and fit in the same solid angle. The bearing 14 has a symmetrical axis 20, which is usually substantially perpendicular to the axis of the rotor.

The spherical bearing 14 allows the flopping, lead-lag and incidence movements of the blade 10 (respectively arrows $f1$, $f2$ and $f3$ of FIG. 1). This bearing withstands the centrifugal force F exerted on the blade and the lateral stresses caused by the aerodynamical trail T of the blade.

In order to perfectly distribute the strains generated in the bearing, it is known to give it a special design by providing throughout the whole thickness of the stack, a cone or truncated cone-shaped opening 21, whose axis of symmetry is axis 20 and whose diameter is decreasing from the outer layer of the stack towards the inner layer connected to the globe-shaped end piece 15. This opening 21 is connected to holes 22 and 23 of axis 20 formed in pieces 15 and 16.

As indicated hereinabove, it is the aim of the invention to increase the life of such a flexible spherical bearing.

FIG. 3 illustrates a flexible bearing 25 according to the invention, the life of which is clearly increased.

Said bearing differs from the bearing 14 in that the opening constitutes a cavity 26 filled with an incompressible fluid.

The cavity 26 filled with fluid is closed at its end by closure elements 27 and 28 screwed in the holes 22 and 23. In the illustrated example, the cavity 26 is truncated cone-shaped with a diameter decreasing from the outer layer towards the inner layer of the stack. Is is obvious that other shapes may be considered for the cavity besides that of a truncated cone.

The fluid 29 is an incompressible, liquid or viscous fluid, compatible with the materials composing the stack, for example an ether-glycol or a silicone oil.

Tests were carried out with a flexible bearing of the type schematized in FIG. 3, the fluid 29 being a silicone oil.

These tests were carried out on a joint comprising a stack of 17 layers of rubber about 1 mm. thick and of 16 layers of stainless steel about 0.8 mm. thick, the rubber being of Shore hardness 40 and being obtained from a natural gum.

These tests revealed an obvious increase of the life compared with the known flexible bearings of the type illustrated diagrammatically in FIG. 2 (from 1.200 to 2.000 hours).

It was further noted that, although the axial stiffness in compression had increased, the other stiffness had remained substantially unchanged. Also, the dynamical stresses generated in the bearing and due to the movements, especially incidence movements, remain unchanged, which is highly important to the piloting. Thus, the life of the flexible bearing according to the invention has increased because of the reduction of compressional strains generated in the rubber layers by the centrifugal forces, and this bearing nevertheless retains its dynamic features and does not involve any noticeable alterations in the piloting system.

Improvements similar to those hereinabove stated may be made according to the invention, to other types of bearings comprising a stack of alternate layers of rubber and metal, or even of rubber and non-metallic strong composite material.

Thus FIG. 4 illustrates very diagrammatically a flexible spherical bearing 30 comprising a stack of rubber sheets 31 and metallic reinforcements 32, said sheets and reinforcements being portions of spherical, substantially annular surfaces alternated and adhesively interconnected. The end sheets are connected to parts 33 and 34 and the bearing has an axis of symmetry 35.

According to the invention, a cavity 36, limited by parts 33, 34 and by the inner edges of sheets 31 and reinforcements 32, is filled with a fluid 39 showing the same characteristics as fluid 29. Axis 35 is the axis of symmetry of cavity 36.

The bearing 30 according to the invention has a lateral stiffness determined mainly by the rubber-metal stack. The crushing stiffness in the axial direction is high, but the torsional rigidity remains low due to the presence of the fluid.

FIG. 5 illustrates yet another embodiment of a bearing according to the invention, and in particular a flexible bearing 40 for a racket motor nozzle.

This bearing 40 is constituted by a stack of alternate annular layers of rubber 41 and of metal 42 adhesively interconnected. The layers 41 and 42 are arranged so as to form spherical surfaces.

Each layer 41 comprises an opening 46 formed in its center and filled with a fluid 49 having the same characteristics as the fluid 29 indicated hereinabove. The whole bearing forms an annular body about axis 45 of the nozzle. The openings 46 are intercommunicating by means of holes 47 formed in the metallic layers. The openings 46 are filled with fluid from a passage 44a formed in one (44) of the end pieces 43 and 44 between which is fixed the stack. As in the preceding cases, an inner volume is effectively obtained which is filled with an incompressible fluid and which extends between the end pieces 43 and 44.

Because of the introduction of the fluid 49 into the openings 46 the bearing 40 allows a substantial reduction of the steering torque when vectoring, whilst retaining nearly the same value of axial stiffness, compared with a bearing comprising a simple stack of solid alternate layers of rubber and metal. The reference 48 designates the steering jack of the nozzle 50.

Various modifications and additions may of course be effected to the different embodiments, hereinabove described, of a joint according to the invention without departing from the scope of protection defined by the accompanying claims. In particular, the field of application of the joints according to the invention is obviously not limited to the examples hereingiven.

What is claimed is:

1. A spherical bearing for connecting a helicopter rotor hub to a rotor blade comprising:

a first and a second end piece connected respectively to the opposite ends of a stack, said first and second end pieces each having respective first and second spherical surfaces which are concentrically arranged, said stack including a plurality of interconnected first and second spherical layers, said first and second layers being arranged to alternate in said stack, said first layers being formed of resilient material, said second layers being formed of metallic material, said first and second layers having a common axis of symmetry and the opposite ends of said stack contacting said first and second spherical surfaces, and at least one completely closed cavity formed centrally in said stack and extending between said end pieces and being free of said resilient material, said cavity being filled with an incompressible fluid to increase the resistance of said joint to compressive stresses, and said axis of symmetry being common to said cavity and to said stack.

2. A spherical bearing according to claim 1, wherein said resilient material is an elastomer.

3. A spherical bearing according to claim 1, wherein said layers formed of resilient material are in contact with said first and second spherical surfaces.

4. A spherical joint according to claim 1, wherein said second layers formed of metallic material extend across said cavity and through said incompressible fluid.

5. A spherical bearing according to claim 1, wherein said first end piece is connected to a helicopter rotor hub and said second end piece is connected to a rotor blade of said helicopter.

6. A spherical bearing according to claim 5, wherein said cavity has a truncated cone shape.

7. A spherical joint according to claim 1, wherein said cavity is formed by openings in said first layers, which openings communicate with one another by means of passages formed in said second layers for the passage of said incompressible fluid.

* * * * *